United States Patent Office 3,083,003
Patented Mar. 26, 1963

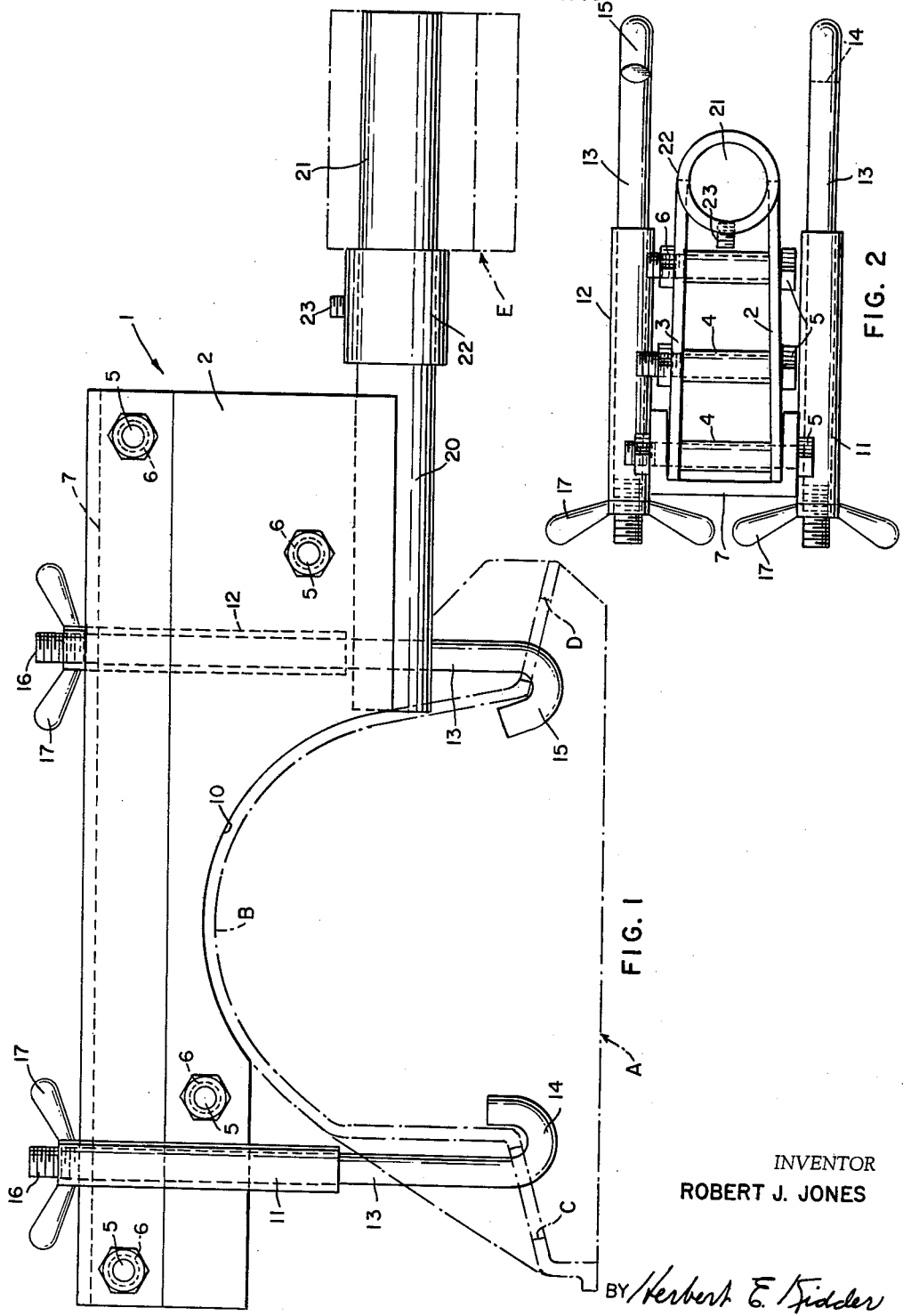

3,083,003
HOLDING FIXTURE FOR BUICK DYNAFLOW TRANSMISSIONS
Robert J. Jones, 15551 La Paz Drive, Victorville, Calif.
Filed Feb. 18, 1960, Ser. No. 9,547
2 Claims. (Cl. 269—47)

The present invention relates generally to fixtures for holding the automatic transmission of an automotive vehicle while the same is being worked on, and more specifically to a holding fixture designed particularly to handle the "Dynaflow" transmission of the Buick automobile for all models from 1948 to 1960, inclusive. The design of the Dynaflow transmission is such that it is difficult to secure the same on a holding fixture for dis-assembly, adjustment, and re-assembly, owing to the fact that there are no mounting points on the outside of the housing to which a fixture can be attached. Heretofore, it has been necessary to remove the bell housing and other portions of the transmission case before the transmission could be secured to a holding fixture, which is laborious, time-consuming, and physically tiring to the mechanic who must work on the transmission in an awkward and inconvenient position.

The Dynaflow transmission has a bell-shaped converter housing at the front end thereof which bolts directly to the cylinder block of the engine, and behind this is the main transmission case which encloses the drive clutch, planetary gear sets, and low and reverse bands. The rear end of the transmission housing constitutes the rear bearing retainer, and bolted to the underside of the main transmission case is a control valve assembly, which is covered by an oil pan. On opposite sides of the main transmission case are two band adjustment holes with removable covers, which enable the mechanic to get at the low range and reverse bands for adjustment purposes.

The primary object of the present invention is to provide a new and improved holding fixture which can be attached to an automatic transmission of the class described without disassembling the case other than removing the band adjustment hole covers.

Another object of the invention is to provide a fixture which allows the transmission to be held at bench height in any desired angular position about a horizontal axis of rotation, and ir which the transmission is approximately balanced about the axis of rotation for ease of turning and locking.

A further object of the invention is to provide a holding fixture for the Dynaflow transmission which may be quickly and easily attached to the transmission casing after the same has been lowered from the automobile by means of a transmission jack. The transmission casing and attached holding fixture may then be lifted to the work bench holding collet for further work by the mechanic, while the transmission casing is held at a convenient working height.

These and other objects and advantages of the present invention will become apparent to those skilled in the art upon consideration of the following detailed description of the preferred embodiment thereof, reference being had to the accompanying drawings, wherein:

FIGURE 1 is a side elevational view of a holding fixture embodying the principles of the present invention, showing a transmission held in the fixture; and FIGURE 2 is an end view of the fixture alone.

In the drawings, the top half of a Dynaflow transmission is shown in phantom lines, and is designated by the reference character A. The transmission case A includes an arched housing portion B, having a low range band adjustment hole C on one side thereof and a reverse band adjustment hole D on the other side.

The holding fixture of my invention comprises a frame 1, which is adapted to lie transversely across the top of the transmission case A and is secured thereto in a manner to be described presently. The frame 1 comprises a pair of parallel steel plates 2 and 3, which normally lie in vertical planes, spaced apart laterally by tubuar spacers 4. Bolts 5 pass through holes in the plates 2 and 3, and through the spacers 4, and are secured by nuts 6. An inverted channel iron 7 overlies the top edges of the plates 2 and 3, and is attached thereto by the top two bolts 5. The bottom edges of the plates 2 and 3 are formed with an arcuate seat 10, which fits snugly against the arched portion B of the transmission case.

Welded or otherwise fixed to opposite sides of the channel iron 7 at opposite sides of the arcuate seat 10 are two vertically disposed, tubular barrels 11 and 12. The tubular barrels 11 and 12 are disposed almost directly above the band adjustment holes C and D, respectively, when the transmission case A is secured on the holding fixture. Slidably disposed within the tubular barrels 11, 12 are elongated, straight shanks 13 of hooks 14 and 15. The upper ends of the shanks 13 project above the top ends of the barrels 11, 12 and are threaded at 16 to receive wingnuts 17. The wing nuts 17 bear against the top ends of the barrels 11, 12, and when the nuts are screwed clockwise onto the threaded shank portions 16, the hooks 14 and 15 are drawn upwardly.

The hooks 14 and 15 are adapted to be inserted down through the band adjustment holes C and D of the transmission case A, and are engageable with one edge of the hole as shown in FIGURE 1. The hooks are rotatable within the barrels 11, 12, which enables them to be turned in any direction to facilitate inserting them through the holes. With the hooks 14, 15 securely hooked on the housing at the edges of the holes C and D, the wing nuts are turned so as to draw the hooks upwardly, thereby clamping the arched housing portion B tightly against the arcuate seat of the frame 1.

Fixed to the bottom edges of the plates 2 and 3 and projecting laterally from one end thereof is a heavy steel shaft 20, the outer end 21 of which is adapted to be rotatably received within a conventional bench collet E. The bench collet E has suitable means (not shown) for locking the fixture at any angular position about the longitudinal axis of the shaft 20, so that the transmission case A may be held in the most convenient working position. A spacing collar 22 encircles the shaft 20 and bears at one end against the adjoining end of the collet E. The collar 22 is locked in position along the shaft by means of a set screw 23, and serves to locate the transmission far enough out from the edge of the bench to permit free rotation of the fixture and transmission to different working positions.

The longitudinal axis of the shaft 20 is located so that it passes closely adjacent the center of gravity of the transmission when all of the gears and other mechanism are installed in place. Thus, the weight of the transmission is substantially balanced about the axis of rotation of the fixture, making it relatively easy to turn the transmission to the different working positions, and to lock the work in the selected position.

While I have shown and described in considerable detail what I believe to be the preferred form of my invention, it will be understood by those skilled in the art that various changes may be made in the shape and arrangement of the several parts thereof, without departing from the broad scope of the invention as defined in the following claims.

I claim:
1. A holding fixture for an automatic transmission hav- ing a case with a pair of band adjustment holes on opposite sides thereof, said holding fixture comprising a frame having a seat thereon formed to receive one side of said case in a snug-fitting engagement, a pair of laterally spaced hooks depending from said frame, said hooks being adapted to be inserted through said band adjustment holes and gripping one edge thereof, means for tightening said hooks so as to draw said case tightly against said seat, and means for supporting said frame and attached case at bench height.

2. A holding fixture for an automatic transmission having an arched case with a pair of band adjustment holes provided on opposite sides thereof, said holding fixture comprising a frame adapted to lie transverse to said case and having an arcuately curved seat formed on one side thereof to receive the arched portion of said case, a pair of hooks depending from said frame on opposite sides of said arcuately curved seat, said hooks being adapted to be inserted through said band adjustment holes and engaging one edge thereof, means for tightening said hooks so as to draw said case tightly against said arcuately curved seat, and a shaft fixed to one end of said frame and projecting laterally therefrom, the outer end of said shaft being receivable within a bench collet to support said frame and attached case at bench height.

References Cited in the file of this patent
UNITED STATES PATENTS

| | | |
|---|---|---|
| 50,941 | Macotter | Nov. 14, 1865 |
| 632,381 | Theadore | Sept. 5, 1899 |
| 1,344,385 | Crays | June 22, 1920 |
| 1,587,682 | Siegfried et al. | June 8, 1926 |
| 1,667,616 | Wright et al. | Apr. 24, 1928 |
| 2,513,959 | Onsrud | July 4, 1950 |
| 2,707,819 | Silliman | May 10, 1955 |